United States Patent [19]

Manion et al.

[11] 4,196,626

[45] Apr. 8, 1980

[54] FLUERIC NOTCH FILTER TEMPERATURE OR DENSITY SENSOR

[75] Inventors: Francis M. Manion, Rockville; Tadeusz M. Drzewiecki, Silver Spring; Richard M. Phillippi, Highland; Charles E. Paras, Suitland, all of Md.

[73] Assignee: The United States of America as represented by the Secretary of the Army, Washington, D.C.

[21] Appl. No.: 963,719

[22] Filed: Nov. 27, 1978

[51] Int. Cl.² ............................................. G01K 1/00
[52] U.S. Cl. ................................... 73/339 A; 137/835
[58] Field of Search ...................... 73/339 A; 137/835

[56] References Cited

U.S. PATENT DOCUMENTS

| 3,566,689 | 3/1971 | Ringwall et al. | 73/339 A |
| 3,572,123 | 3/1971 | Boothe et al. | 73/339 A |
| 3,618,385 | 11/1971 | Kelley et al. | 73/339 A |

*Primary Examiner*—Donald O. Woodiel
*Attorney, Agent, or Firm*—Nathan Edelberg; Robert P. Gibson; Saul Elbaum

[57] ABSTRACT

The temperature sensors shown utilize a constant frequency fluidic oscillator to excite resonance tubes, whose frequency response is a function of temperature. The outputs of these sensors control a fluidic amplifier, whose output is rectified and filtered to produce a D.C. fluid signal which is a function of the sensed temperature. Different embodiments utilize resonance tubes excited in phase or 180° out of phase to sense the difference between two temperatures or to provide increased sensitivity.

9 Claims, 3 Drawing Figures

FLUERIC NOTCH FILTER TEMPERATURE OR DENSITY SENSOR

RIGHTS OF THE GOVERNMENT

The invention described herein may be manufactured, used and licensed by or for the Unied States Government for governmental purposes without the payment to us of any royalty thereon.

BACKGROUND OF THE INVENTION

This invention relates to temperature sensing devices. More particularly, this invention relates to devices wherein temperature is measured by change in fluid characteristics when subjected to such temperature.

Temperature sensing in exotic or hostile environments is a demanding requirement. Fluidic sensors have proven invaluable in these environments because they can be formed of almost any material, including ceramics. Past fluidic temperature sensors have typically relied on the effect of temperature on flow resistance in small passages such as capillary tubes. These small passages are susceptible to plugging due to contamination of the fluid supply.

SUMMARY OF THE INVENTION

Accordingly it is an object of this invention to provide a fluidic temperature sensor which is highly reliable because it is insensitive to contaminants.

It is a further object of this invention to provide a fluidic temperature sensor having a high output capability.

Another object of this invention is to provide a temperature sensor that can operate continuously at temperature extremes, limited only by the melting or embrittlement temperatures of the sensor material.

Yet another object of the invention is to provide a temperature sensor which uses changes in frequency response of a resonance tube to determine temperature.

To achieve the above objects the present invention uses resonance tubes as temperature sensors. The resonance tubes are excited at a constant frequency by a fluidic oscillator and their output may be amplified. Because the frequency response of the resonance tubes is a function of temperature the output of the resonance tubes can then be rectified and filtered to produce a fluidic signal whose pressure is a function of temperature. A pair of resonance tubes can be excited in phase, with one tube held at a reference temperature and the other tube used as a sensor. The differential signal produced thereby is representative of the difference in temperature between the sensor and the reference temperature. Alternately, the pair of resonance tubes can be excited out of phase to produce a differential pressure output double that of a single tube.

DESCRIPTION OF THE PREFERRED EMBODIMENTS

Figure 1:
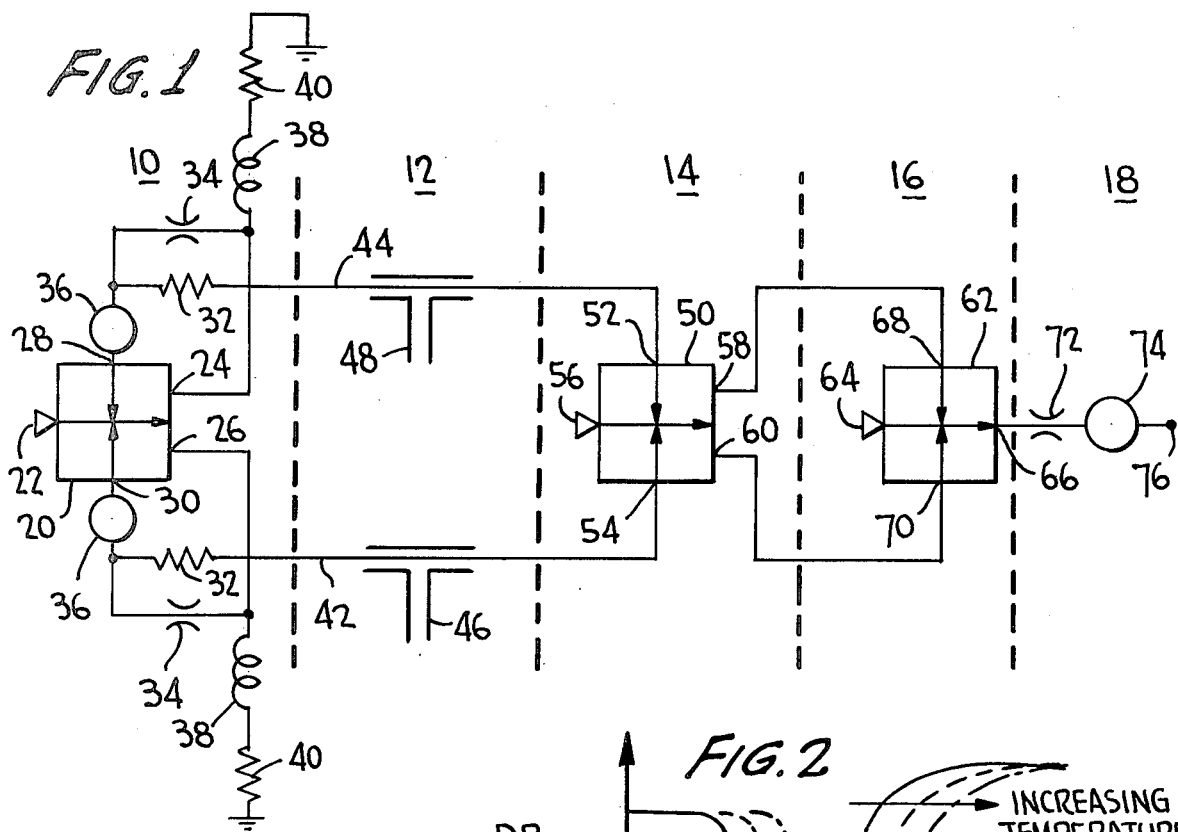
FIG. 1 is a schematic drawing of one embodiment of the invention.

Referring now to FIG. 1, a temperature sensor in accordance with the present invention is shown. The sensor of FIG. 1 includes the following components: a frequency generator 10, sensors 12, amplifier 14, rectifier 16, and filter 18.

The frequency generator 10 includes a fluidic amplifier 20 having a source of fluid pressure 22 connected therewith. In the amplifier 20 a power stream from the source 22 is alternately deflected toward one or the other of output ports 24 and 26. When the output is directed toward output port 24 the output is fed back to control port 28 which serves to deflect the power jet toward output port 26. Then the output is fed back to control port 30 which deflects the power jet back to output port 24. Thus the output of the amplifier oscillates between output ports 24 and 26 with the outputs of the two ports, 24 and 26, 180° out of phase. The feedback paths each include a flow resistance 32 and an orifice 34 in parallel as well as a volume capacitance 36, sized to make the amplifier frequency independent of temperature, as is well known in the art. Each feedback path is vented to ground through a fluidic inductance 38 and resistance 40, sized to eliminate any net flow through lines 42 and 44. Thus the outputs of oscillator 10 are constant frequency pressure pulses, 180° out of phase, in lines 42 and 44.

Figure 2:
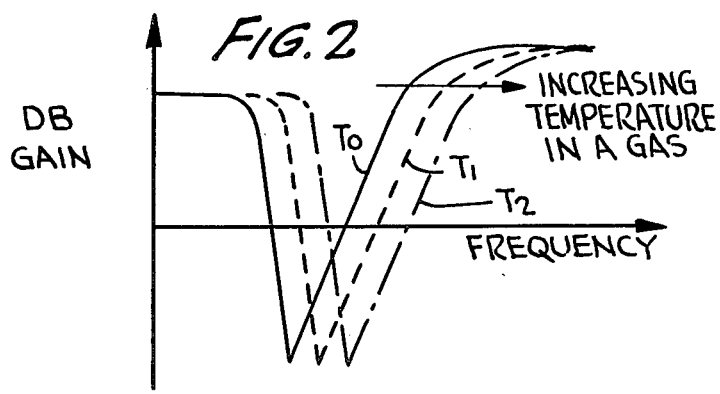
FIG. 2 is a graph illustrating the frequency response of resonance tubes as a function of temperature.

Sensor section 12 includes two resonance tubes sensors 46 and 48. The resonance tube sensors 46 and 48 each consist of a tube connected by a tee to fluid lines 42 and 44, respectively. The frequency response at various temperatures of the resonance tubes is shown in FIG. 2. This notch response can be attributed to the rarefaction wave traveling back from the tube termination, 180° out of phase with the output signal so that signal cancellation occurs. A rarefaction wave thus will cancel out the signal in multiples of the half wavelength of the tube, where an open resonance tube is used. A terminated or blocked tube will cancel out the signal at multiples of the quarter wavelength. Thus either an open or closed resonance tube can be used for purposes of this invention. Now, because the acoustic velocity in a gas varies as the square root of the absolute temperature the frequency response curve will shift with increasing temperature as shown in FIG. 2. Thus the resonance tubes 46 and 48 will modulate the amplitude of the constant frequency pressure signals in lines 42 and 44 as a function of the temperature of the resonance tubes.

In the embodiment of FIG. 1 both resonance tubes 46 and 48 can be used to sense the same unknown temperature and may be combined in a single probe. Their outputs are processed by a fluidic analog differential pressure amplifier 50. Differential amplifier 50 serves as an algebraic summing device, and when the inputs to the two control ports 52 and 54 are in phase the amplitude of the output at ports 58 and 60 will represent the difference between the amplitudes of the inputs. Conversely, when the inputs are 180° out of phase amplifier 50 will perform addition and its output will represent the total of the amplitudes of the inputs at 52 and 54. In the device of FIG. 1, because the inputs to amplifier 50 are 180° out of phase, if both resonance tubes 46 and 48 are at the same temperature, the amplitude of the output at ports 58 and 60 will be double that produced by a single input.

To produce a D.C. pressure signal representative of the temperature difference between the resonance tubes 46 and 48, the outputs of amplifier 50 are rectified by fluidic rectifier 62. Fluidic rectifier 62 is a single output proportional amplifier having a power stream supplied by fluid pressure source 64 and a single center output port 66. Control ports 68 and 70 are supplied by outputs 58 and 60 from amplifier 50 and cause the power jet from source 64 to oscillate from one side to the other. As the amplitude of the oscillations increase, progressively more of the power stream will be vented by vents, now shown, on both sides of output port 66. Since the amplitude of the oscillations is a function of the temperature of the resonance tubes 46 and 48, the output of fluidic rectifier 62 will also be a function of temperature.

The RMS output of rectifier 62 is then obtained by filtering the output of rectifier 62. Orifice 72 and volume capacitance 74 form a fluidic low pass filter to provide a DC pressure output at 76 representative of the temperature sensed by resonance tubes 46 and 48.

Figure 3:
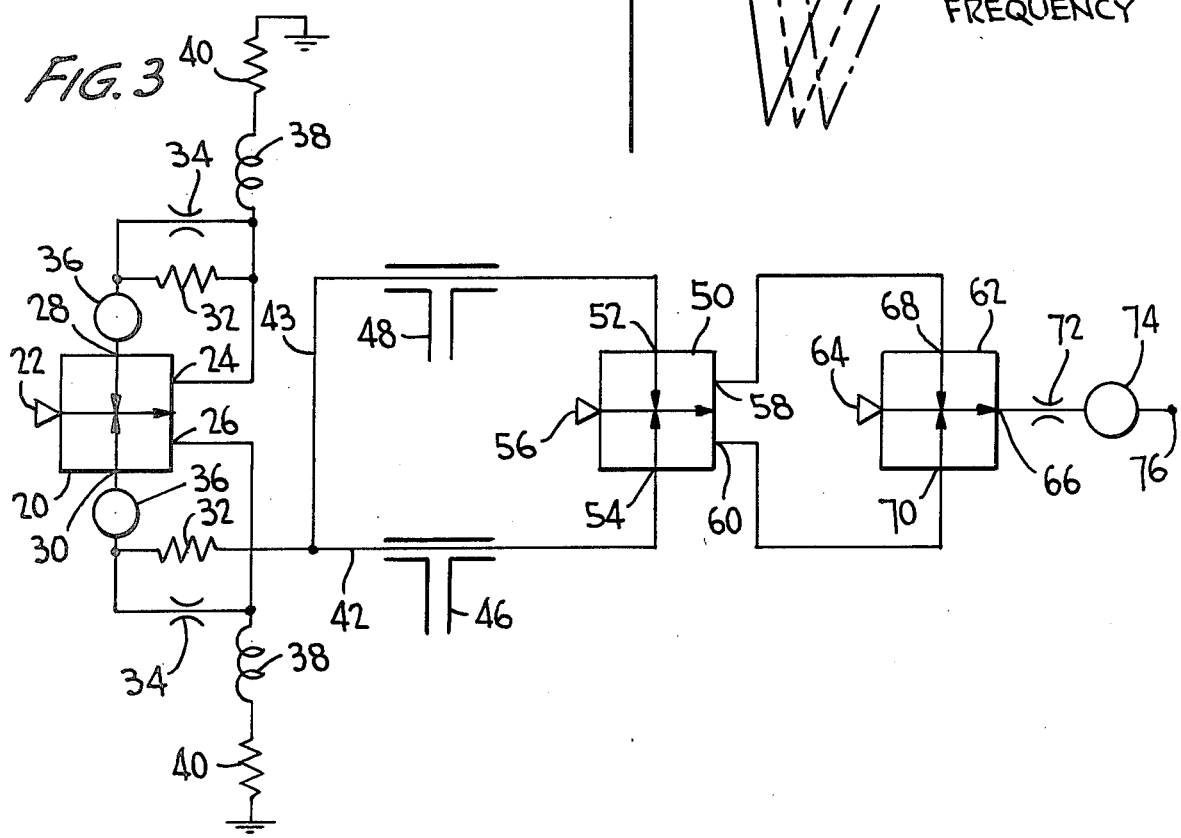
FIG. 3 is a schematic drawing of another embodiment of the invention.

FIG. 3 illustrates a second embodiment of the present invention wherein two resonance tube sensors are excited in phase. In FIG. 3 similar numbers represent the same element as those shown in FIG. 1. In this embodiment resonance tube sensor 48 is connected by fluid line 43 to fluid line 42 so that both sensors 46 and 48 are excited in phase by output port 26 of fluidic amplifier 20. This is the only difference in construction between the embodiments of FIGS. 1 and 3.

Though the structural differences between the out-of-phase device of FIG. 1 and the in-phase device of FIG. 3 are minor, a substantially different mode of operation is achieved. With the pulses from the resonance tubes 46 and 48 arriving in phase at amplifier 50, amplifier 50 will function as a subtractor. For example, if two pulses of equal strength arrive in phase at opposite control inputs 52 and 54 of amplifier 50, they will balance each other and cause no oscillation of the power jet. The output of rectifier 62 will then be maximum. Accordingly, the output produced by the in-phase device of FIG. 3 will represent the difference between the temperatures of the two resonance tubes 46 and 48. This arrangement is useful, for example, in control applications where a closed loop controller is used to maintain a controlled temperature the same as some reference value, since it provides the error between two temperatures.

From the foregoing, it should now be apparent that the temperature sensing apparatus has been provided which is well adapted to fulfill the aforestated objects of the invention. It should be recognized, however, that the invention may be embodied in other forms without departing from the spirit of the invention. For example, it is not essential that the source of fluid pressure signals be a fluidic oscillator. It could as well be any other source of fluid pressure signals such as a speaker driven by an electronic function generator. A single resonance tube could be replaced by several tubes and more than one stage of amplification of the output signal from the resonance tubes could be used.

Similarly the invention can be utilized in several different ways without departing from the scope thereof. As disclosed above the invention can be used with the resonance tubes driven either in-phase or out-of-phase. Both devices can be used with a reference temperature probe and the out-of-phase device can utilize both probes sensing the same temperature to increase sensitivity. It will be recognized that by appropriate selection of the length of the resonance tube, the device can be matched to their applications so that either a positive or negative slope of output versus temperature may be achieved.

Accordingly, the embodiments of the invention disclosed herein should be regarded as illustrative of the invention, the scope of the invention being indicated by the appended claims.

What is claimed is:
1. A temperature sensing device comprising:
 (a) Generating means for generating constant frequency pressure pulses, said generating means having a first output
 (b) A temperature sensing means comprising a first resonance tube for modulating the amplitude of said pressure pulses from said first output as a function of the temperature to be sensed.
2. The device of claim 1 wherein said resonance tube is open ended.
3. The device of claim 1 wherein said generating means comprises a fluidic oscillator.
4. The device of claim 3 wherein said generating means has a second output and the device further comprises a second resonance tube, said second resonance tube modulating the amplitude of pulses from said second output.
5. The device of claim 4 further comprising a summing means to combine the outputs of said first and second resonance tubes.
6. The device of claim 5 wherein the output pulses from said first and second resonance tubes are in phase and said summing means functions as a subtractor.
7. The device of claim 5 wherein the output pulses from said first and second resonance tubes are 180° out of phase and said summing means functions as an adder.
8. The device of claim 5 further comprising a fluidic rectifying means to rectify the output of said summing means.
9. The device of claim 8 further comprising a fluidic filter receiving the output of said rectifying means to filter out high frequency pressure pulses.